United States Patent [19]

Okuda et al.

[11] Patent Number: 5,048,486
[45] Date of Patent: Sep. 17, 1991

[54] IGNITION CIRCUIT WITH TIMING CONTROL

[75] Inventors: Hiroshi Okuda, Himeji; Kyoichi Kamoshita, Yoshikawa, both of Japan

[73] Assignees: Mitsubishi Denki Kabushiki Kaisha; Tohatsu Corporation, both of Tokyo, Japan

[21] Appl. No.: 561,749

[22] Filed: Aug. 2, 1990

[30] Foreign Application Priority Data

Aug. 3, 1989 [JP] Japan .................................. 1-203226

[51] Int. Cl.⁵ ............................ F02P 5/06; F02P 5/14
[52] U.S. Cl. .................................. 123/418; 123/424; 123/602
[58] Field of Search ............ 123/149 C, 179 BG, 406, 123/421, 424, 599, 602, 625, 418

[56] References Cited

U.S. PATENT DOCUMENTS 3,964,258 6/1976 Romano et al. ................ 123/421 X
4,027,478 6/1977 Masaki et al. .................. 123/406 X
4,790,280 12/1988 Umehara et al. ................... 123/424

FOREIGN PATENT DOCUMENTS 195378 10/1985 Japan .

Primary Examiner—Tony M. Argenbright
Attorney, Agent, or Firm—Sughrue, Mion, Zinn, Macpeak and Seas

[57] ABSTRACT

An ignition apparatus which determines ignition timing corresponding to the running state of an internal combustion engine. Ignition timing is advanced for a period when a choke switch 21 used for improving startability of the engine at a low temperature is closed, and for a predetermined period after the choke switch is opened as determined by the time constant of an RC circuit. When the predetermined period passes after the choke switch is opened, the ignition timing is delayed to a characteristic suitable for the running of the engine after warm up.

14 Claims, 3 Drawing Sheets

IGNITION CIRCUIT WITH TIMING CONTROL

BACKGROUND OF THE INVENTION

1. Field of the Invention

The present invention relates to an ignition apparatus for an internal combustion engine such as an outboard motor and the like, and particularly to an ignition apparatus which improves the startability of the internal combustion engine.

2. Description of Related Art

FIG. 1 shows a circuit diagram of a conventional ignition apparatus of the capacitor discharge type for an internal combustion engine. In the figure, reference numeral 1 designates a power coil of a magneto generator (not shown) driven by an engine (not shown). The power coil 1 generates an alternating current output in synchronism with the rotation of the engine. The power coil 1 is connected to the anode of a diode 2 which rectifies the alternating current output from the power coil 1, and a cathode of the diode 2 is connected to a capacitor 3 which is charged by the output of the diode 2. Reference numeral 4 designates a signal coil which generates an ignition signal corresponding to the ignition timing of the engine. The signal coil 4 is installed on the magneto generator and generates an alternating current output in synchronism with the rotation of the engine. The signal coil 4 is connected to the anode of a diode 6 which rectifies the alternating current from the signal coil 4 through a resistance 5 which limits the alternating current of the signal coil 4. The cathode of the diode 6 is connected to the gate of a thyristor 7 which is rendered by receiving the ignition signal of the signal coil 4 and discharges the electric charge of the capacitor 3 through an ignition coil 8. In addition, reference numeral 9 designates a spark plug which emits sparks by receiving high voltage generated at the ignition coil 8.

Next, an explanation will be given. Alternating current from the power coil 1 is rectified by the diode 2, and the capacitor 3 is charged. The ignition signal generated by the signal coil 4 corresponding to the ignition timing of the engine is applied to the gate of the thyristor 7 through the resistance 5 and the diode 6. When the ignition signal is applied and the thyristor 7 is, gated on the electric charge stored in the capacitor 3 is discharged through the primary coil of the ignition coil 8. When the electric charge is discharged, a high voltage is generated at the secondary coil of the ignition coil 8 and fires the spark plug 9.

In an ignition apparatus having the above-described construction, there are problems in that the startability of engine at a low temperature is poor, and the rotation of the engine is unstable, even after starting, until the engine temperature rises. In order to solve these problems, the ignition timing is advanced for a predetermined period after starting, however, as it always has a constant spark advance characteristic both at the lower temperature period and at the high temperature period of the engine, the ignition timing is advanced even at the high temperature period of the engine at which time there is no need to advance, resulting in the rotation of engine being unnecessarily high. In order to solve the problem, it is possible to install a temperature sensor, however, the construction in that case is complicated resulting in an apparatus of high cost.

SUMMARY OF THE INVENTION

The present invention has been devised in order to solve the above problems. An object of the present invention is to provide an ignition apparatus having an easy and inexpensive construction, and good startability at the low temperature period of the engine. Another object of the invention is to provide an ignition apparatus having an easy and inexpensive construction, and good stability at the time of warming-up of the engine.

By paying attention to a choke switch used for improving startability at the low temperature period, the ignition apparatus of the present invention which determines the ignition timing corresponding to the running condition of the internal combustion engine is provided with advance signal outputting means which outputs an advance signal of ignition timing for the on-period of the choke switch and for a predetermined period after the choke switch is turned off, and with means which advances the ignition timing advance on the basis of the output from the advance signal outputting means. The ignition timing is advanced at the initial period of engine start, that is, when the engine is at a low temperature, and the ignition timing is more delayed than that at the initial period of engine start when the rotation of the engine is stabilized and at a high temperature. The ignition timing is controlled in such a way that both the startability even at a low temperature period and the stability at a warming-up period are good.

The above and further objects and features of the invention will more fully be apparent from the following detailed description with accompanying drawings.

DESCRIPTION OF THE PREFERRED EMBODIMENTS

Figure 1:
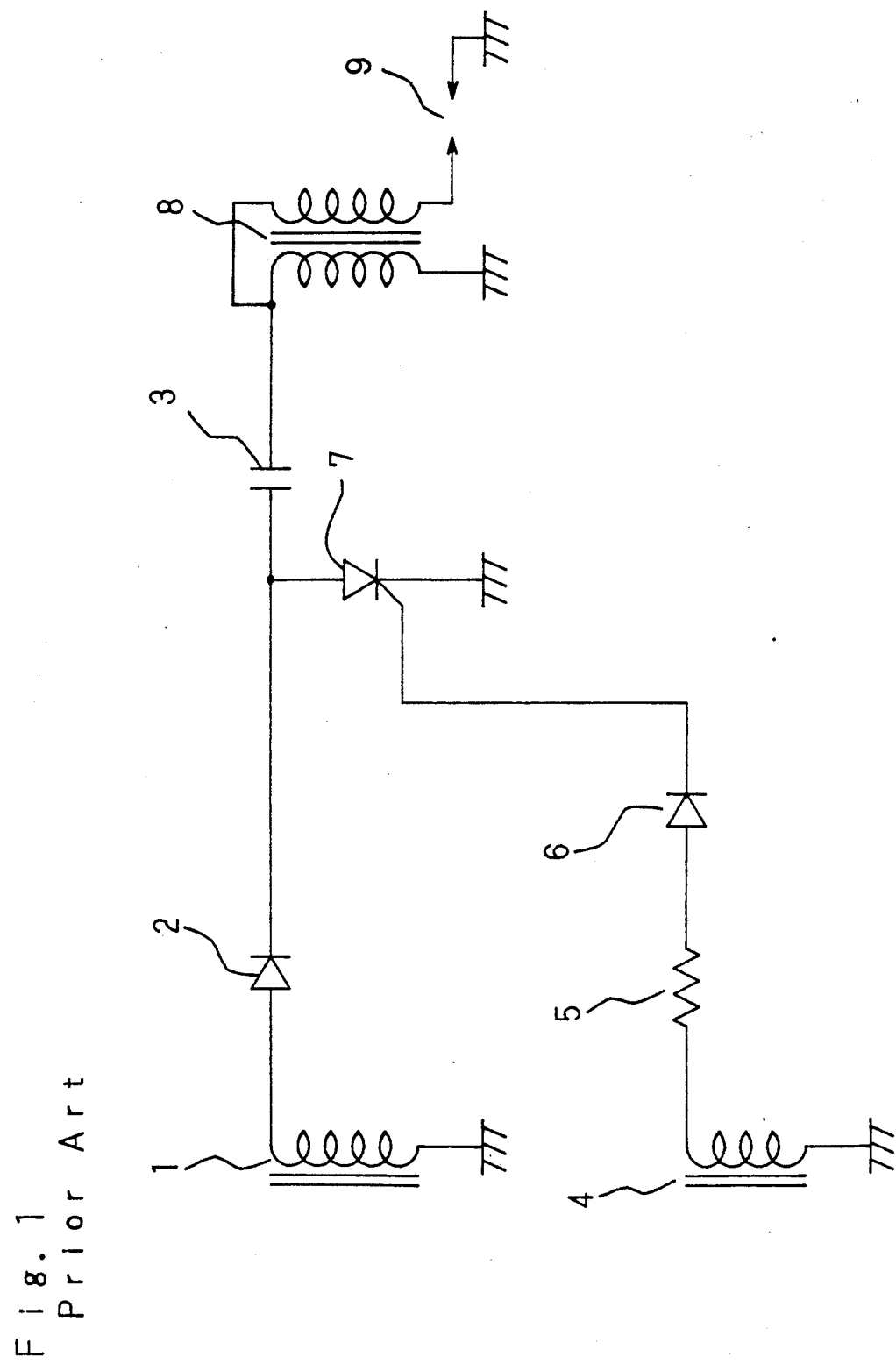
FIG. 1 is a circuit diagram of a conventional ignition apparatus.

In the following, a description will be made of the present invention referring to the drawings showing the embodiment thereof.

Figure 2:
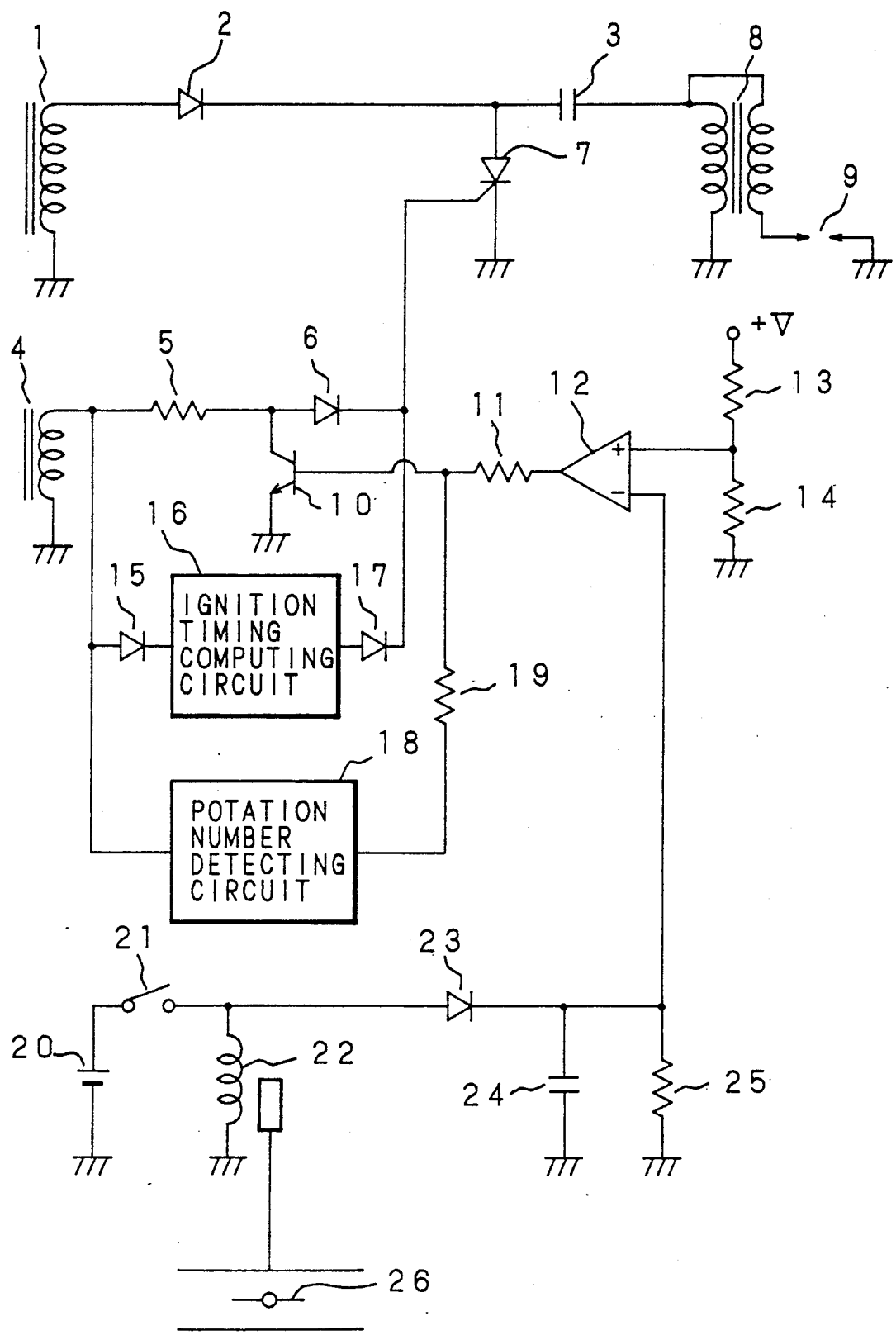
FIG. 2 is a circuit diagram of an ignition apparatus according to one embodiment of the present invention.

In FIG. 2, as the elements shown by reference numerals 1-9 are the same as in FIG. 1, an explanation thereof is omitted. In addition, the generation characteristic of the ignition signal of the signal coil 4 is shown by a broken line in FIG. 3, which is more advanced than a usual one.

Reference numeral 10 designates a transistor, the collector thereof being connected to the resistance 5 and the anode of the diode 6. The base of the transistor 10 is connected to the output of a comparator 12 to be described later though a resistance 11, as well as to the output of a rotation number detecting circuit 18 to be described later through a resistance 19. The emitter of the transistor 10 is grounded, and when the transistor 10 is conductive, the ignition signal of the signal coil 4 is by-passed. A non-inverting on positive input of the comparator 12 is connected to the node of a resistance 13 to whose one end a predetermined voltage $+V$ is applied and a resistance 14 whose one end is grounded, an inverting or negative input of the comparator 12 being connected to a resistance 25 whose one end is grounded. The comparator 12 compares a reference voltage which is made by dividing the voltage V by the resistances 13 and 14 with a voltage across the resistance 25. When the latter voltage applied to the negative comparator is lower than the former voltage to be applied to the positive input, the comparator 12 outputs a signal to the base of the transistor 10, and vice versa. The input of the rotation number detecting circuit 18 is connected to the signal coil 4. The rotation number detecting circuit 18 detects the rotation number of the engine on the basis of the ignition signal of the signal coil 4. When the detection result is larger than a predetermined number N, the rotation number detecting circuit 18 outputs a signal to the base of the transistor 10, and vice versa.

The signal coil 4 is also connected to the anode of a diode 15, the cathode of the diode 15 being connected to the input of an ignition timing computing circuit 16. An output of the ignition timing computing circuit 16 is connected to the gate of the thyristor 7 through a diode 17. When the transistor 10 is conductive and the ignition signal of the signal coil 4 is not applied to the gate of the thyristor 7, the ignition timing computing circuit 16 computes the ignition timing to output the ignition signal to the gate of the thyristor 7.

Reference numeral 20 is a battery, a positive electrode of the battery 20 being connected to one terminal of a choke switch 21. The other terminal of the choke switch 21 is connected to a choke solenoid 22 whose one end is grounded, and to an anode of a diode 23. By switching on/off the choke switch 21, the energization/de-energization of the choke solenoid 22 is controlled, and the quantity of air taken into the engine from a choke valve 26 is adjusted. The cathode of the diode 23 is connected to the resistance 25 and to a capacitor 24 whose one end is grounded. As the capacitor 24 and the resistance 25 are connected in parallel, the voltages of both are the same.

Next, an explanation will be made.

Usually, at the time of starting the engine at a low temperature, the choke switch 21 is closed by an operator. Then, the choke solenoid 22 is energized to close the choke valve 26, and current flows through the diode 23 from the battery 20 to charge the capacitor 24. When the capacitor 24 is fully the voltage across the resistance 25 becomes equal to the capacitor voltage. The reference voltage from the voltage divider 13 14 and the voltage across the resistance 25 (that is, the charge voltage of the capacitor 24) are compared by the comparator 12. At this time, as the voltage applied to the negative input of the comparator 12 (the charge voltage of the capacitor 24) is set higher than the voltage to be applied to the positive input (the reference voltage), no signal is outputted from the comparator 12. Accordingly, the transistor 10 is not conductive, and the ignition signal of the signal coil 4 is not by-passed but is applied to the gate of the thyristor 7 through the resistance 5 and the diode 6, the thyristor 7 being gated on. Hence, the ignition timing of the engine is shown by the broken line in FIG. 3, which is advanced versus the ignition timing shown by the solid line to be described later. Accordingly, during the period when the choke switch 21 is closed, that is, when the engine is at a low temperature, the startability of the engine is improved.

For a predetermined period after the choke switch 21 is opened, the capacitor 24 keeps its charge. Therefore, even in this period, in the same way as when the choke switch is closed, no signal is outputted from the comparator 12, the ignition signal of the coil 4 is not bypassed, and the thyristor 7 is conductive. As a result, the ignition timing remains advanced as shown by the broken line in FIG. 3. After the engine is started and the choke switch 21 is opened, the rotation at a low speed is instable until the temperature of the engine rises. But in the present invention, even after the choke switch 21 is opened, as the ignition timing is advanced for the predetermined period, such instability is avoided. Here, as the predetermined period, a sufficient period for the engine to warm up is set.

After the choke switch is opened and the predetermined period is passed, the capacitor charge decreases below the reference voltage applied to the positive input of the comparator 12, and a signal is then outputted from the comparator to the base of the transistor 10. Then, the transistor 10 is conductive, and the ignition signal of the signal coil 4 is by passed to ground. In this case, the ignition signal is applied to the gate of the thyristor 7 from the ignition timing computing circuit 16 through the diode 17 and, the ignition timing is delayed as shown by the solid line in FIG. 3.

On the other hand, when the detected rotation number of the engine obtained by the rotation number detecting circuit 18 not larger than the predetermined number N, no signal is outputted from the rotation number detecting circuit, and the transistor 10 is not conductive. In this case, the ignition signal of the coil 4 is not by-passed, and the ignition timing is advanced as shown by the broken line is FIG. 3, as described above. When the detected rotation number is larger than the predetermined number N, however, a signal is outputted from the rotation number detecting circuit 18 to the base of the transistor 10, and the transistor 10 becomes conductive. As a result, the ignition signal of the coil 4 is bypassed, and the ignition signal having the timing characteristic as shown by the solid line in FIG. 3 computed by the ignition timing computing circuit 16 is applied to the gate of the thyristor 7. The ignition timing is thus delayed as shown by the solid line in FIG. 3. In this way, when the rotation number of the engine becomes larger than N, and it is thus judged that the rotation is sufficiently stable and the engine is sufficiently warmed up the ignition timing is changed to a characteristic suitable for the running of the engine after warm up.

Figure 3:
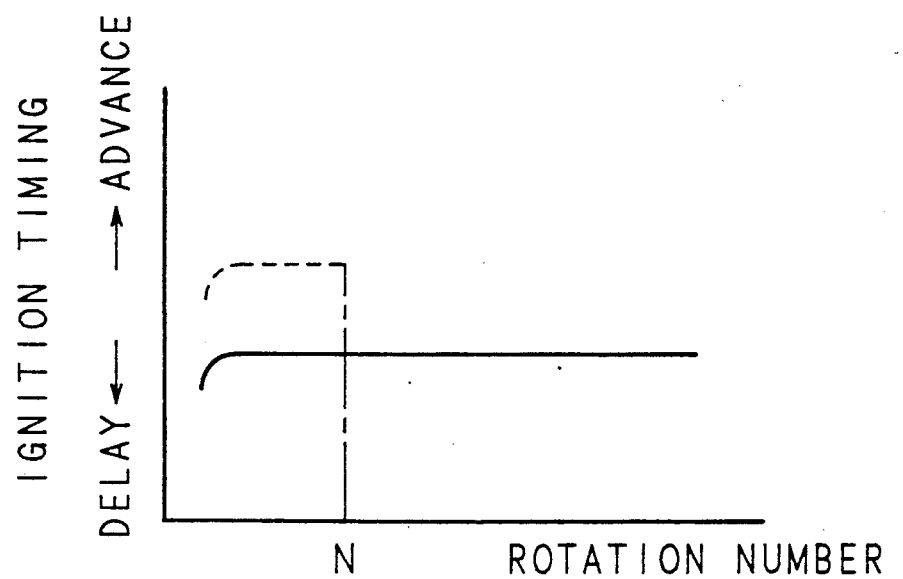
FIG. 3 shows an ignition timing characteristic for an ignition apparatus of the present invention.

Needless to say, the ignition timing characteristic shown in FIG. 3 is one example, and other ignition timing characteristic may also be possible.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. An ignition apparatus which determines an ignition timing corresponding to the running state of an internal combustion engine provided with a choke switch, comprising:

advance signal outputting means for outputting an advance signal of the ignition timing during a period when said choke switch is closed and for a predetermined period after said choke switch is opened; and advancing means for advancing the ignition timing of said internal combustion engine on the basis of said advance signal outputted from said advance signal outputting means.

2. An ignition apparatus as set forth in claim 1, wherein said advance signal outputting means includes;
a signal coil for generating an ignition signal corresponding to the ignition timing of said internal combustion engine;
signal outputting means for outputting a signal for a period except for said period when said choke switch is closed and said predetermined period after said choke switch is opened; and
a transistor disposed between said signal coil and ground, and having a base connected to an output of said signal outputting means.

3. An ignition apparatus as set forth in claim 2, wherein said advance signal outputting means further includes computing means connected to said signal coil for computing an ignition timing of said internal combustion engine when said transistor is conductive.

4. An ignition apparatus as set forth in claim 2, wherein said signal outputting means includes a comparator for inputting a variable voltage varied by an on/off action of said choke switch and a constant reference voltage, and comparing both voltages.

5. An ignition apparatus as set forth in claim 4, wherein, for said period when said choke switch is closed and for said predetermined period after said choke switch is opened, said variable voltage is higher than said reference voltage, and said comparator does not output a signal to said base.

6. An ignition apparatus as set forth in claim 2, wherein said signal coil generates an advanced ignition timing signal.

7. An ignition apparatus as set forth in claim 2, further comprising detecting means for detecting a rotation number of said internal combustion engine.

8. An ignition apparatus as set forth in claim 7, wherein said detecting means is connected to the base of said transistor, and when the rotation number of said internal combustion engine is larger than a predetermined number, said detecting means outputs a signal to said base.

9. An ignition apparatus as set forth in claim 8, wherein said signal coil generates an advanced ignition timing signal whose ignition timing is more advanced than a usual one.

10. An ignition apparatus which determines an ignition timing corresponding to the running state of an internal combustion engine provided with a choke switch, comprising:
a signal coil for generating an advanced ignition timing signal for said internal combustion engine;
a comparator for inputting a variable voltage varied by an on/off action of said choke switch and a constant reference voltage, and comparing both voltages;
a transistor disposed between said signal coil and ground, and having a base connected to an output of said comparator; and
computing means connected to said signal coil for computing an ignition timing of said internal combustion engine when said transistor is conductive.

11. An ignition apparatus as set forth in claim 10, wherein said variable voltage is higher than said reference voltage for a period when said choke switch is closed and for a predetermined period after said choke switch is opened.

12. An ignition apparatus as set forth in claim 11, wherein said comparator outputs a signal to said base when said variable voltage is lower than said reference voltage, and does not output a signal when said variable voltage is higher than said reference voltage.

13. An ignition apparatus as set forth in claim 10, further comprising detecting means for detecting a rotation number of said internal combustion engine.

14. An ignition apparatus as set forth in claim 13, wherein said detecting means is connected to the base of said transistor, and when the rotation number of said internal combustion engine is larger than a predetermined number, said detecting means outputs a signal to said base.

* * * * *